(12) United States Patent
Hua et al.

(10) Patent No.: US 8,437,412 B2
(45) Date of Patent: May 7, 2013

(54) METHOD AND APPARATUS FOR ELIMINATING FREQUENCY-DOMAIN INTERFERENCE SIGNALS

(75) Inventors: Meng Hua, Shenzhen (CN); Yan Yang, Shenzhen (CN); Jing Yang, Shenzhen (CN); Gengshi Wu, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 647 days.

(21) Appl. No.: 12/636,333

(22) Filed: Dec. 11, 2009

(65) Prior Publication Data

US 2010/0226464 A1 Sep. 9, 2010

(30) Foreign Application Priority Data

Mar. 3, 2009 (CN) .......................... 2009 1 0079157

(51) Int. Cl.
*H04L 27/28* (2006.01)
*H04L 27/06* (2006.01)
*H04B 1/10* (2006.01)

(52) U.S. Cl.
USPC .............................. 375/260; 375/340; 375/350

(58) Field of Classification Search .................. 375/144, 375/146–148, 229, 232, 340, 346, 260, 350
See application file for complete search history.

(56) References Cited

U.S. PATENT DOCUMENTS

| 7,486,726 B2 * | 2/2009 | Alexander et al. ............ 375/232 |
| 2008/0212666 A1 * | 9/2008 | Kuchi et al. .................. 375/231 |

* cited by examiner

*Primary Examiner* — Don N Vo
(74) *Attorney, Agent, or Firm* — Conley Rose, P.C.; Grant Rodolph; Nicholas K. Beaulieu

(57) ABSTRACT

The present invention discloses a method and an apparatus for eliminating frequency-domain interference signals, and relates to communication technologies. The method includes: multiplying a frequency-domain channel estimation value by a frequency-domain interference signal to obtain a frequency-domain received interference signal; and subtracting the frequency-domain received interference signal from the frequency-domain received signal to obtain the frequency-domain received signal free of interference. The apparatus includes a multiplying module and a subtracting module. A frequency-domain equalizer includes an interference signal obtaining module and an interference signal eliminating module. The technical solution provided herein eliminates interference signals in the frequency domain, and saves the calculation load in contrast with elimination of time-domain interference signals.

6 Claims, 4 Drawing Sheets

METHOD AND APPARATUS FOR ELIMINATING FREQUENCY-DOMAIN INTERFERENCE SIGNALS

CROSS-REFERENCE TO RELATED APPLICATION

This application claims priority to Chinese Patent Application No. 200910079157.7, filed on Mar. 3, 2009, which is hereby incorporated by reference in its entirety.

FIELD OF THE INVENTION

The present invention relates to communication technologies, and in particular, to a method and an apparatus for eliminating frequency-domain interference signals.

BACKGROUND

In a Wide Code Division Multiple Access (WCDMA) system, the transmitter transmits signals over public channels such as Common PIlot Channel (CPICH) and Synchronization Channel (SCH). Because the SCH channel is not orthogonal with the High-Speed Physical Downlink Share Channel (HS-PDSCH) that bears information data, interference would occur during demodulation of the HS-PDSCH channel. As to the CPICH, although its channelized codes are orthogonal with the HS-PDSCH, it also causes interference to demodulation of the HS-PDSCH due to impact from the multi-path channel. Elimination of the interference caused by such signals at the receiver improves the demodulation performance of the HS-PDSCH, and improves the average throughput of the WCDMA system.

As shown in FIG. 1, r represents received signals of the WCDMA system, inclusive of the interference signals. Channel estimation is performed with the CPICH in the received signals to obtain a time-domain multi-path channel estimation value h. The method for eliminating interference in the prior art is: A known interference signal generator at the receiver generates an interference signal i for sending, and performs convolution for i and h to obtain the received interference signal v. The received interference signal v is subtracted from the received signal r to obtain the received signal free of interference.

In the process of developing the present invention, the inventor finds that the valid length L of the chip-level time-domain multi-path channel estimation value h is generally more than 20 taps. To eliminate the interference signal whose length is N, the multiplying operation needs to be performed for N*L times, which involves a huge calculation load.

SUMMARY

The embodiments of the present invention provide a method and an apparatus for eliminating frequency-domain interference signals to reduce the calculation load involved in eliminating the time-domain interference signals.

The method for eliminating frequency-domain interference signals includes:
multiplying a frequency-domain channel estimation value by a frequency-domain interference signal to obtain a frequency-domain received interference signal; and
subtracting the frequency-domain received interference signal from the frequency-domain received signal to obtain the frequency-domain received signal free of interference.

The apparatus for eliminating frequency-domain interference signals includes:
a multiplying module, adapted to multiply a frequency-domain channel estimation value by a frequency-domain interference signal to obtain a frequency-domain received interference signal; and
a subtracting module, adapted to subtract the frequency-domain received interference signal obtained by the multiplying module from the frequency-domain received signal to obtain the frequency-domain received signal free of interference.

A frequency-domain equalizer provided in an embodiment of the present invention includes:
an interference signal obtaining module, adapted to obtain a frequency-domain interference signal; and
an interference signal eliminating module, adapted to eliminate the frequency-domain interference signal.

The embodiments of the present invention bring the following benefits: The frequency-domain channel estimation value is multiplied by the frequency-domain interference signal to obtain a frequency-domain received interference signal; the frequency-domain received interference signal is subtracted from the frequency-domain received signal to obtain the frequency-domain received signal free of interference. This technical solution reduces the calculation load in contrast with elimination of the time-domain interference signal.

DETAILED DESCRIPTION

In order to make the technical solution, objectives and merits of the present invention clearer, the following describes the embodiments of the present invention in more detail with reference to accompanying drawings.

Embodiment 1

Figure 1:
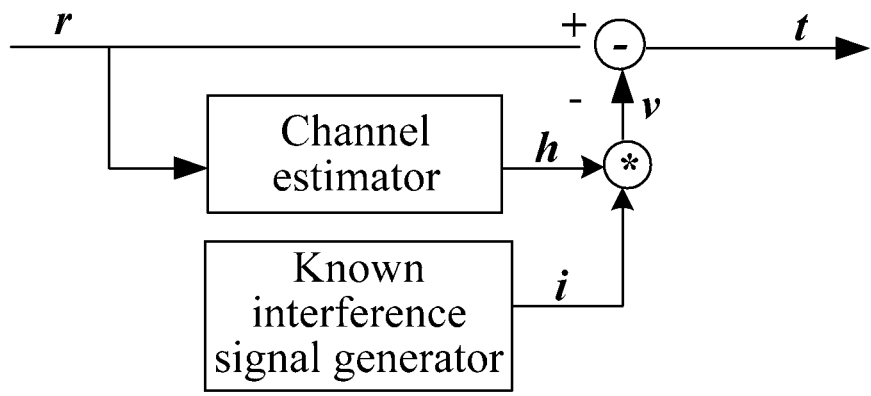
FIG. 1 shows a structure of eliminating time-domain interference signals in the prior art.
Figure 2:
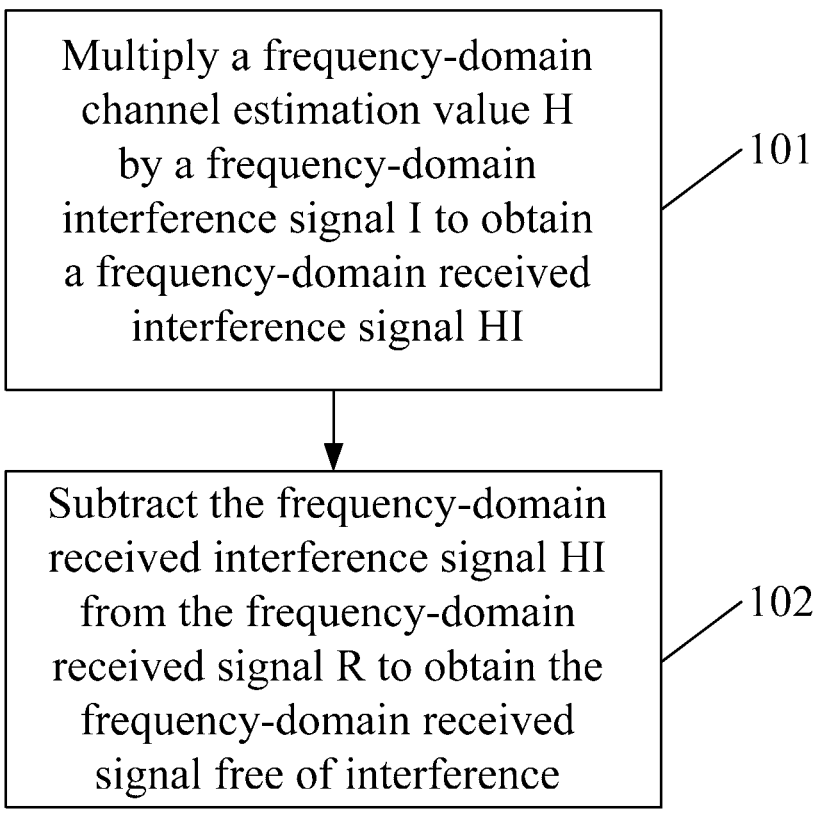
FIG. 2 is a flowchart of a method for eliminating frequency-domain interference signals in the first embodiment of the present invention.

FIG. 2 shows a method for eliminating frequency-domain interference signals in this embodiment. The method includes the following:

Block 101: Multiply a frequency-domain channel estimation value H by a frequency-domain interference signal I to obtain a frequency-domain received interference signal HI.

Block 102: Subtract the frequency-domain received interference signal HI from the frequency-domain received signal R to obtain the frequency-domain received signal free of interference.

Before multiplying a frequency-domain channel estimation value H by a frequency-domain interference signal I, the method further includes the following:

Fast Fourier Transformation (FFT) is performed for r, h, and i respectively to obtain the frequency-domain received signal R, the frequency-domain channel estimation value H, and the frequency-domain interference signal I.

In the method described above, r represents the WCDMA system time-domain received signal inclusive of the interference signal, h represents the time-domain multi-path channel estimation value obtained after channel estimation is performed with the CPICH in the received signal r, and i represents the time-domain interference signal generated by a known interference signal generator at the receiver.

Figure 3:
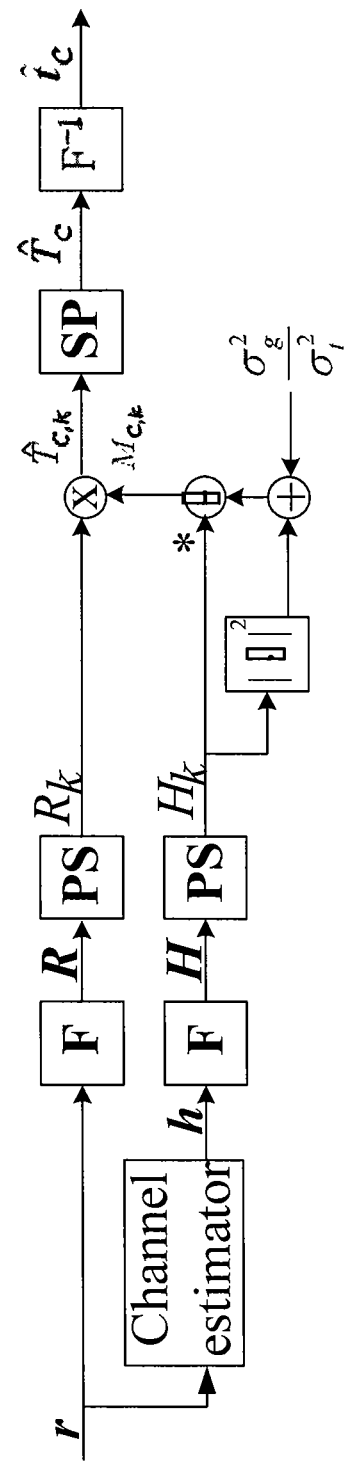
FIG. 3 shows a structure of a frequency-domain equalizer.

Further, the method is applicable to a frequency-domain equalizer. FIG. 3 shows a structure of a frequency-domain equalizer.

Figure 4:
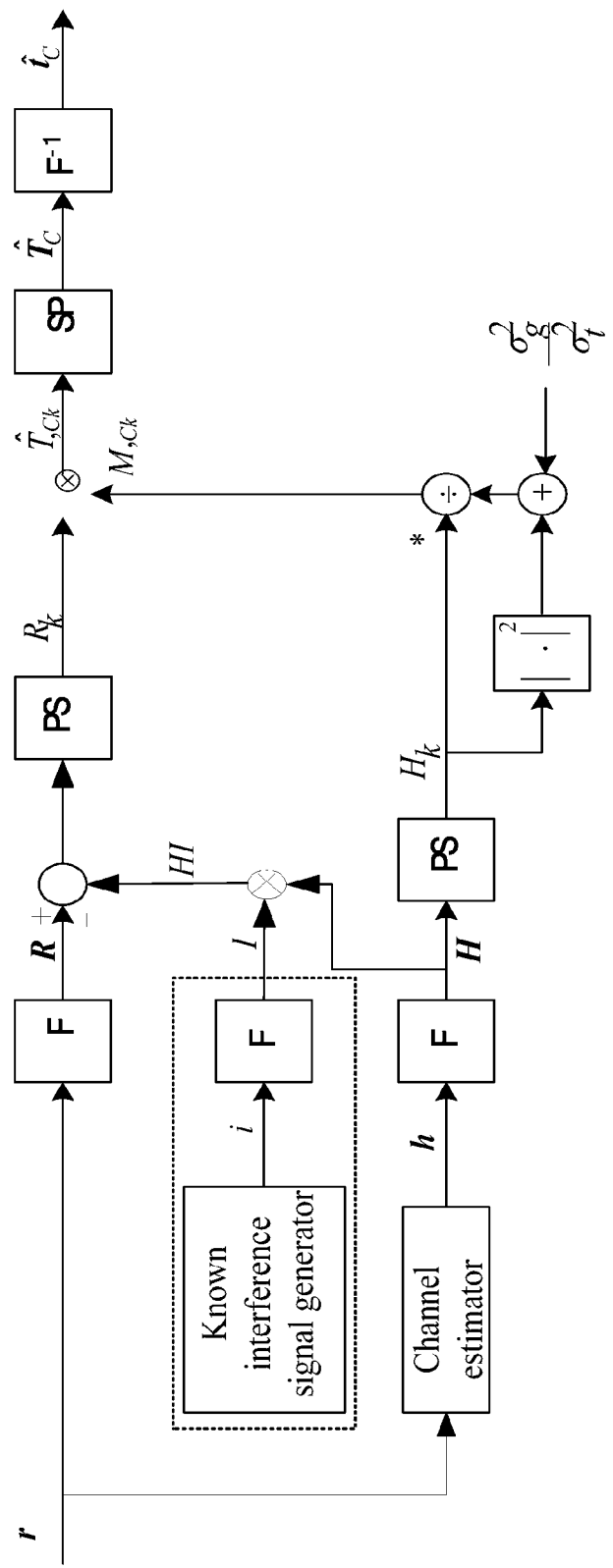
FIG. 4 shows a structure of eliminating frequency-domain interference signals in the frequency-domain equalizer provided in the first embodiment of the present invention.

In FIG. 3, r represents the time-domain received signal, h represents a time-domain multi-path channel estimation value obtained through a channel estimator, F represents FFT, R represents the frequency-domain received signal after the time-domain received signal r undergoes FFT, H represents the frequency-domain channel estimation value after the time-domain multi-path channel estimation value h undergoes FFT, PS represents parallel-to-serial conversion, SP represents serial-to-parallel conversion, $F^{-1}$ represents Inverse Fast Fourier Transform (IFFT) operation, $\sigma_g^2$ is a noise variance, $\sigma_t^2$ is a transmitting signal variance, $M_{C,k}$ is the k diagonal element of the matrix $M_C$, $R_k$ represents k element of the vector R, $H_k$ represents the k element of the vector H, $|\cdot|^2$ represents the modulus square of the scalar, and * represents conjugation of a complex number. Evidently, FFT needs to be performed for the time-domain received signal and the time-domain multi-path channel estimation value in the frequency-domain equalizer. As shown in FIG. 4, in order to eliminate the frequency-domain interference signal in the frequency-domain equalizer, it is only necessary to perform FFT for the time-domain interference signal i obtained by a known interference signal generator. The FFT of the time-domain received signal and the FFT of time-domain multi-path channel estimation value can share the two FFT processes in the frequency-domain equalizer. Therefore, in order to eliminate the frequency-domain interference signal in the frequency-domain equalizer, it is necessary to perform multiplying operations for only about N-2N times, thus reducing the calculation load massively.

Further, the FFT may be performed for the time-domain interference signal beforehand according to the block length of the frequency-domain equalizer to obtain the frequency-domain interference signal and store the signal. In this way, the signal can be directly applied to eliminate the frequency-domain interference signal, thus further reducing the calculation load.

In this embodiment, the FFT is performed for the time-domain received signal, time-domain multi-path channel estimation value, and time-domain interference signal, involving a calculation load of O (N*log N). In the method of eliminating the time-domain interference signal, the chip-level time-domain multi-path channel estimation value h has a valid length L, which is generally more than 20 taps. For eliminating interference signals whose length is N, the number of times of the multiplying operation required is about N*L. Therefore, the method provided in this embodiment reduces the calculation load in contrast with the method of eliminating the time-domain interference signal. Further, if a frequency-domain equalizer is applied in the elimination of the frequency-domain interference signal, because the FFT of the time-domain received signal and the FFT of time-domain multi-path channel estimation value can share such two FFT processes in the frequency-domain equalizer, it is necessary to perform multiplying operations for only about N-2N times in order to eliminate the frequency-domain interference signal, thus reducing the calculation load massively.

Embodiment 2

Figure 5:
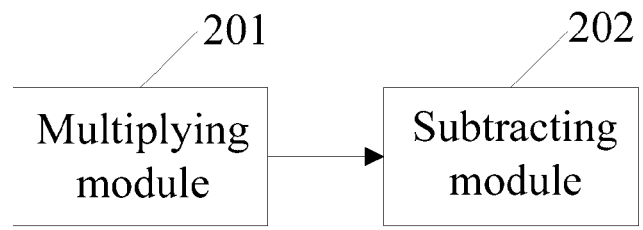
FIG. 5 shows a structure of an apparatus for eliminating frequency-domain interference signals in the second embodiment of the present invention.

As shown in FIG. 5, an apparatus for eliminating frequency-domain interference signals in this embodiment includes:

a multiplying module 201, adapted to multiply a frequency-domain channel estimation value H by a frequency-domain interference signal I to obtain a frequency-domain received interference signal HI; and a subtracting module 202, adapted to subtract the frequency-domain received interference signal HI obtained by the multiplying module from the frequency-domain received signal R to obtain the frequency-domain received signal free of interference.

Figure 6:
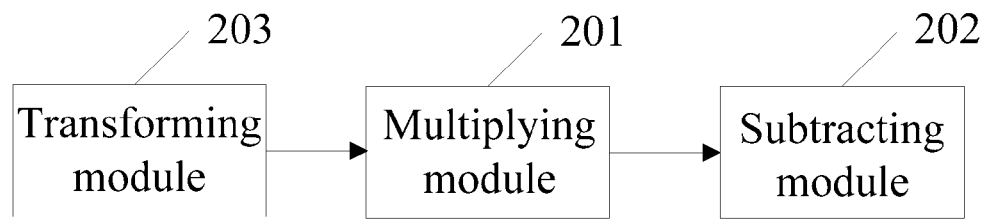
FIG. 6 shows a structure of another apparatus for eliminating frequency-domain interference signals in the second embodiment of the present invention.

As shown in FIG. 6, the apparatus further includes a transforming module 203, which is adapted to perform FFT for r, h, and i respectively to obtain the frequency-domain received signal R, the frequency-domain channel estimation value H, and the frequency-domain interference signal I.

In the method described above, r represents the WCDMA system time-domain received signal inclusive of the interference signal, h represents the time-domain multi-path channel estimation value obtained after channel estimation is performed with the CPICH in the received signal r, and i represents the time-domain interference signal generated by a known interference signal generator at the receiver.

Further, the apparatus may be used together with a frequency-domain equalizer. FIG. 3 shows a structure of a frequency-domain equalizer.

In FIG. 3, r represents the time-domain received signal, h represents a time-domain multi-path channel estimation value, F represents FFT, R represents the frequency-domain received signal after the time-domain received signal r undergoes FFT, H represents the frequency-domain channel estimation value after the time-domain multi-path channel estimation value h undergoes FFT, PS represents parallel-to-serial conversion, SP represents serial-to-parallel conversion, $F^{-1}$ represents IFFT operation, $\sigma_g^2$ is a noise variance, $\sigma_t^2$ is a transmitting signal variance, $M_{C,k}$ is the k diagonal element of the matrix $M_C$, $R_k$ represents k element of the vector R, $H_k$ represents the k element of the vector H, $|\cdot|^2$ represents the modulus square of a scalar, and * represents conjugation of a complex number. Evidently, FFT needs to be performed for the time-domain received signal and the time-domain multi-path channel estimation value in the frequency-domain equalizer. As shown in FIG. 4, in order to eliminate the frequency-domain interference signal in the frequency-domain equalizer, it is only necessary to perform FFT for the time-domain interference signal i obtained by a known interference signal generator. The FFT of the time-domain received signal and the FFT of time-domain multi-path channel estimation value can share the two FFT processes in the frequency-domain equalizer. Therefore, in order to eliminate the frequency-domain interference signal in the frequency-domain equalizer, it is necessary to perform multiplying operations for only about N-2N times, thus reducing the calculation load massively.

The apparatus may further include a storing module, which is adapted to perform FFT for the time-domain interference signal beforehand according to the block length of the frequency-domain equalizer to obtain the frequency-domain interference signal and store the signal. In this way, the signal can be directly applied to eliminate the frequency-domain interference signal, thus further reducing the calculation load.

In this embodiment, the FFT is performed for the time-domain received signal, time-domain multi-path channel estimation value, and time-domain interference signal, involving a calculation load of O (N*log N). In the method of eliminating the time-domain interference signal, the chip-level time-domain multi-path channel estimation value h has a valid length L, which is generally more than 20 taps. For eliminating interference signals whose length is N, the number of times of the multiplying operation required is about N*L. Therefore, the technical solution provided in this embodiment reduces the calculation load in contrast with the method of eliminating the time-domain interference signal. Further, if a frequency-domain equalizer is used together with the apparatus for eliminating the frequency-domain interference signal, because the FFT of the time-domain received signal and the FFT of time-domain multi-path channel estimation value can share such two FFT processes in the frequency-domain equalizer, it is necessary to perform multiplying operations for only about N-2N times in order to eliminate the frequency-domain interference signal, thus reducing the calculation load massively.

Embodiment 3

Figure 7:
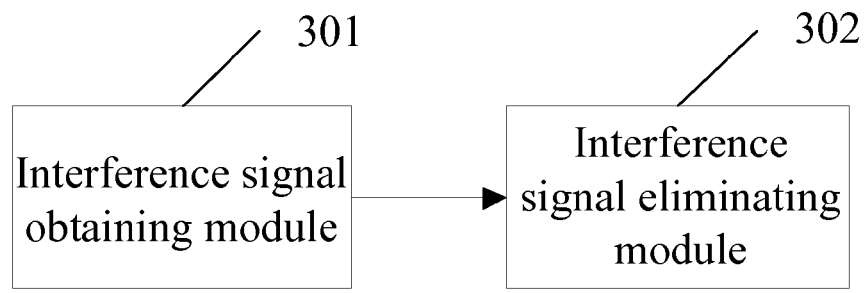
FIG. 7 shows a structure of a frequency-domain equalizer in the third embodiment of the present invention.

As shown in FIG. 7, a frequency-domain equalizer is provided in this embodiment. The frequency-domain equalizer includes:

an interference signal obtaining module 301, adapted to obtain a frequency-domain interference signal; and an interference signal eliminating module 302, adapted to eliminate the frequency-domain interference signal.

The interference signal obtaining module includes:

an interference signal generator, adapted to generate a time-domain interference signal; and an FFT unit, adapted to perform FFT for the time-domain interference signal to obtain the frequency-domain interference signal.

The interference signal obtaining module further includes a storing unit, which is adapted to store the frequency-domain interference signal.

The interference signal eliminating module 302 may include:

a multiplying module, adapted to multiply a frequency-domain channel estimation value H by a frequency-domain interference signal I obtained by the transforming module to obtain a frequency-domain received interference signal HI; and a subtracting module, adapted to subtract the frequency-domain received interference signal HI obtained by the multiplying unit from the frequency-domain received signal R to obtain the frequency-domain received signal free of interference.

The frequency-domain equalizer may further include:

a signal receiving module, adapted to receive WCDMA system time-domain received signal r inclusive of interference signals; and a channel estimator, adapted to perform channel estimation with the CPICH in the received signal r to obtain a time-domain multi-path channel estimation value h.

The FFT unit is further adapted to perform FFT for r and h to obtain the frequency-domain received signal R and the frequency-domain channel estimation value H.

In this embodiment, FFT is performed for the time-domain interference signal, which is combined with the FFT of the time-domain received signal and the FFT of time-domain multi-path channel estimation value in the frequency-domain equalizer to eliminate the frequency-domain interference signal. It is necessary to perform multiplying operations for only about N-2N times in order to eliminate the frequency-domain interference signal, thus reducing the calculation load massively in contrast with the elimination of the time-domain interference signal. Further, if the frequency-domain interference signal is stored beforehand, the FFT of the time-domain received signal and the FFT of time-domain multi-path channel estimation value in the frequency-domain equalizer can be used to quicken the elimination of the frequency-domain interference signal and further reduce the calculation load.

The embodiments of the present invention may be implemented through software. The software program may be stored in a readable storage medium such as a hard disk of the computer, a buffer, or a Compact Disk (CD).

Although the invention has been described through some exemplary embodiments, the invention is not limited to such embodiments. It is apparent that those skilled in the art can make modifications and variations to the invention without departing from the spirit and scope of the invention. The invention is intended to cover the modifications and variations provided that they fall in the scope of protection defined by the following claims or their equivalents.

What is claimed is:

1. A method for eliminating a frequency-domain interference signal, comprising:

performing Fast Fourier Transformation (FFT), for r, h, and i respectively to obtain a frequency-domain received signal, a frequency-domain channel estimation value, and a frequency-domain interference signal, wherein, r represents a time-domain received signal inclusive of a time-domain interference signal, h represents a time-domain multi-path channel estimation value, and i represents the time-domain interference signal;

multiplying the frequency-domain channel estimation value by the frequency-domain interference signal to obtain a frequency-domain received interference signal; and subtracting the frequency-domain received interference signal from the frequency-domain received signal to obtain the frequency-domain received signal free of interference.

2. The method of claim 1, further comprising:

performing Fast Fourier Transformation (FFT) for the time-domain interference signal according to a block length of a frequency-domain equalizer to obtain the frequency-domain interference signal, and pre-storing the frequency-domain interference signal.

3. An apparatus for eliminating a frequency-domain interference signal, comprising:

a multiplying module, adapted to multiply a frequency-domain channel estimation value by a frequency-domain interference signal to obtain a frequency-domain received interference signal; and a subtracting module, adapted to subtract the frequency-domain received interference signal obtained by the multiplying module from a frequency-domain received signal to obtain the frequency-domain received signal free of interference;

a transforming module, adapted to perform Fast Fourier Transformation (FFT) for r, h, and i respectively to obtain the frequency-domain received signal, the frequency-domain channel estimation value, and the frequency-domain interference signal;

wherein, r represents a time-domain received signal inclusive of a time-domain interference signal, h represents a time-domain multi-path channel estimation value, and i represents the time-domain interference signal.

4. The apparatus of claim 3, further comprising:
a storing module, adapted to perform Fast Fourier Transformation (FFT) for the time-domain interference signal according to a block length of a frequency-domain equalizer to obtain the frequency-domain interference signal, and pre-store the frequency-domain interference signal.

5. A frequency-domain equalizer, comprising:
an interference signal obtaining module, adapted to obtain a frequency-domain interference signal; and
an interference signal eliminating module, adapted to eliminate the frequency-domain interference signal;
wherein the interference signal obtaining module comprises: an interference signal generator, adapted to generate a time-domain interference signal; and a Fast Fourier Transformation (FFT) unit, adapted to perform FFT for the time-domain interference signal to obtain the frequency-domain interference signal;
wherein the interference signal eliminating module comprises: a multiplying unit, adapted to multiply a frequency-domain channel estimation value by the frequency-domain interference signal to obtain a frequency-domain received interference signal; and a subtracting module, adapted to subtract the frequency-domain received interference signal obtained by the multiplying unit from a frequency-domain received signal to obtain the frequency-domain received signal free of interference.

6. The frequency-domain equalizer of claim 5, wherein the interference signal obtaining module further comprises:
a storing unit, adapted to store the frequency-domain interference signal.

* * * * *